May 26, 1970    R. A. PEARSON    3,513,623
APPARATUS FOR END-LOADING CARTONS
Filed Nov. 9, 1967    7 Sheets-Sheet 3

INVENTOR.
REINHOLD A. PEARSON
BY
ATTYS.

United States Patent Office 3,513,623
Patented May 26, 1970

3,513,623
APPARATUS FOR END-LOADING CARTONS
Reinhold A. Pearson, c/o R. A. Pearson Company,
E. 304 2nd Ave., Spokane, Wash. 99202
Filed Nov. 9, 1967, Ser. No. 681,824
Int. Cl. B65b 57/10
U.S. Cl. 53—61                    8 Claims

ABSTRACT OF THE DISCLOSURE

An apparatus is described for end-loading cans into cartons positioned transversely on a single carton conveyor. The apparatus includes a reciprocable carriage mounted alongside the carton conveyor. A feed conveyor is mounted transverse to the carriage for feeding cans onto the carriage. The carriage has two adjacent load compartments that are alternatively shifted between a loading station and a feeding station. Pusher means are mounted adjacent the loading stations for alternatively pushing loads of cans from the load compartments into cartons positioned adjacent the loading station. The carton conveyor indexes the cartons forward each time the carriage shifts so that one carton conveyor can efficiently service two loading stations. An article holding and separating device is mounted between the feed conveyor and the carriage for holding the can from being fed while the carriage is shifted. The device also moves the forward rank of cans back slightly so that the cans on the carriage are not scraped or damaged by the front rank of cans on the feed conveyor.

BACKGROUND OF THE INVENTION

This invention relates to apparatus for end-loading a predetermined number of uniformly sized articles such as bottles, cans, package goods and the like into cartons or cases.

Most bottles, cans and package goods are placed in paperboard or cardboard cartons for shipping. The cartons are three dimensional rectangular enclosures which have a top, bottom, two sides and two ends. Most cylindrical articles such as cans and bottles are placed upright in the cartons in one or two layers with or without dividers positioned between the layers. The size, weight and number of the article generally determine the most economical arrangement and the shape of the carton or enclosure. Generally, articles are packed in multiples of twelve, with twenty-four being the most popular size. A carton containing twenty-four articles is frequently referred to as a case and the carton containing twelve articles is generally referred to as a half-case. This terminology is most commonly used in the beverage and canned goods industries. A case of twenty-four bottles or cans is generally arranged in a single layer of four rows with six bottles or cans in each row. A half-case is generally arranged in three rows with four cans or bottles in each row.

The cost of the cartons is a significant element of the total cost in the distribution of the articles. The cost of cartons is generally dependent upon the size of the blank cartons. The size of the blank cartons depends upon several of the factors: (1) the number and size of the articles; (2) the arrangement of the articles; and (3) how the articles are loaded into the carton. If the articles are loaded through the top of the carton, the blank carton must be considerably larger than if the articles are loaded through the end of the carton. The reason for this is that the end flaps are considerably smaller than the top or bottom flaps. It has been found that there is as much as a 20% savings in the size of the blank carton that may be obtained when the articles are loaded through the ends of the carton instead of through the top.

Another very important advantage of end-loading is that the cartons are not as easily broken. In top-loading cartons, both the top and bottom surfaces comprise glued or stapled flap joints that can come apart permitting articles to drop out the bottom. The load bearing bottom of an end-loaded carton is a continuous cardboard layer with no glued joints.

The principal problem with the present end-loading machines is that they cannot load the cartons fast enough to keep up with high speed assembly lines. The principal reason for this is that the loading of the articles must be stopped while a load or charge of articles is pushed horizontally into the carton. A further problem with the present end-loading machines is that they require manual positioning of the cartons at the loading stations or that the carton conveying system is not efficiently integrated with the carton loading equipment.

A further disadvantage of the present end-loading machines is that they are too expensive and unreliable. If a carton loading machine breaks down, it may mean that the entire production line must be stopped.

One of the principal objects of this invention is to provide an end-loading machine that is efficient, inexpensive and which is relatively maintenance free.

A further object of this invention is to provide an end-loading machine that is capable of handling greater than 450 cans per minute.

An additional object of this invention is to provide an end-loading machine that has a carton conveyor system that is integrated with a carton loading sequence so that one carton conveyor can efficiently service two loading stations.

A further object of this invention is to provide an end-loading machine that has an efficient carton handling system that may be efficiently and economically integrated with a sealing apparatus for gluing the flaps of the cartons.

An additional object of this invention is to provide a novel article holding and separating device for preventing damage to the cans as they are being transferred from a feed conveyor to a loading station.

These and other objects and advantages of this invention will become apparent upon the reading of the following detailed description of a preferred embodiment of this invention.

BRIEF DESCRIPTION OF THE DRAWINGS

A preferred embodiment of this invention is illustrated in the accompanying drawings, in which.

DETAILED DESCRIPTION OF THE PREFERRED EMBODIMENT

Figure 1:
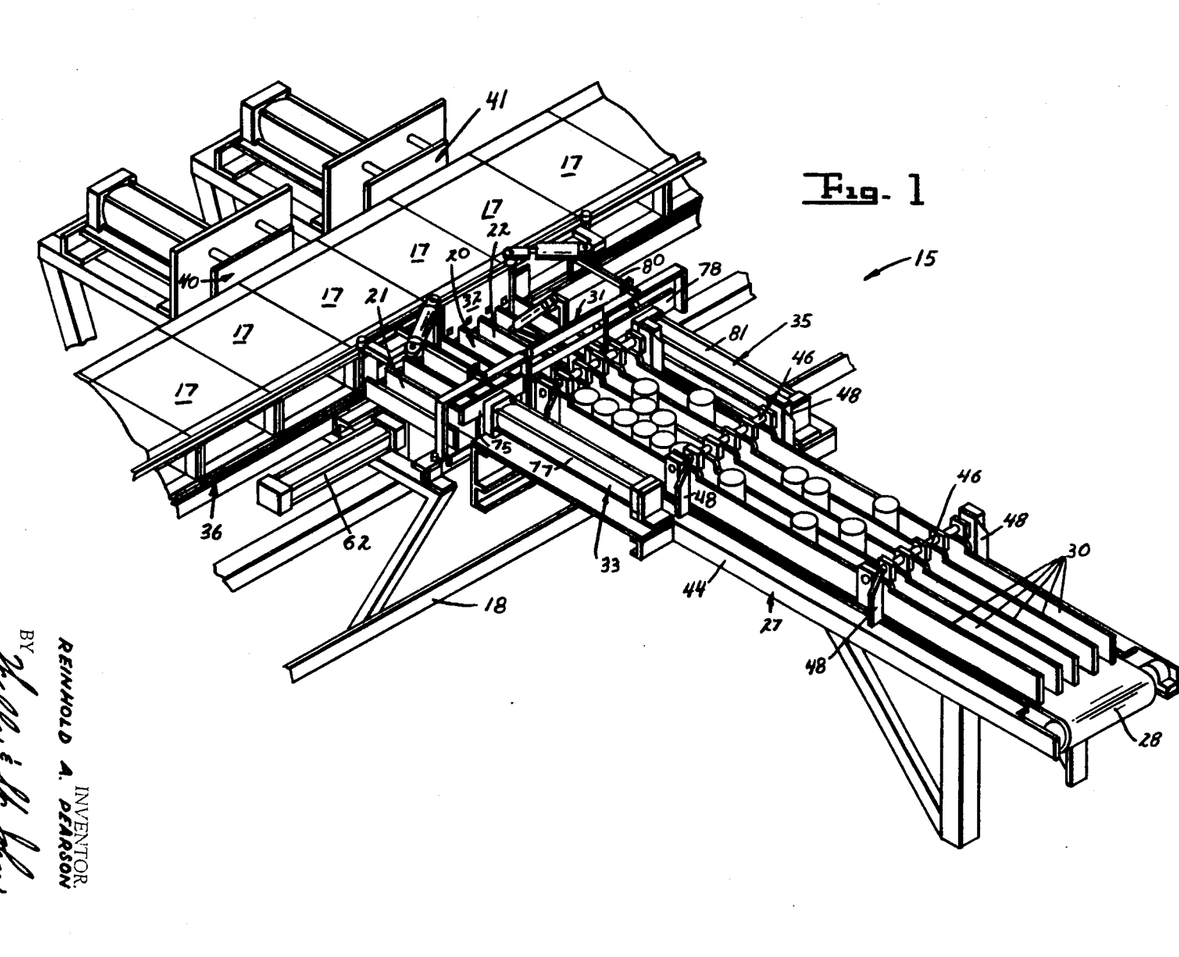
FIG. 1 is a perspective view of an apparatus for end-loading cartons with uniform sized articles.

An end-loading machine generally designated by the numeral 15 is illustrated in FIG. 1. The purpose of the end-loading machine 15 is to load a plurality of uniform sized articles designated by numeral 16 into cartons 17.

The cartons 17 are constructed from paperboard or cardboard that is widely available in the industry. The cartons are loaded with the articles through the ends of the cartons. The ends of the cartons are opened with flaps extending therefrom to be folded and glued together to form glued flap joints for totally enclosing the articles within the cartons.

This machine is particularly adaptable for loading cylindrical articles such as cans or bottles, although other uniformly shaped packaged goods may also be end-loaded into cartons utilizing this invention. For purposes of illustration, the articles shown in the drawings are cans.

The end-loading machine may be adapted to handle many different sized articles. Most frequently the cartons are loaded with either twelve or twenty-four cans. For illustration purposes, the machine illustrated in the drawings is designed to load twenty-four cans into each carton. The cans are loaded into the carton in four rows of six cans each (see FIGS. 7–12). A row is defined as a single line of article parallel with the movement in which the cans are loaded into the cartons. A rank of articles is perpendicular to a row and refers to those articles that are aligned adjacent to each other transversely to the movement of the cans as they are loaded into the cartons.

Figure 2:
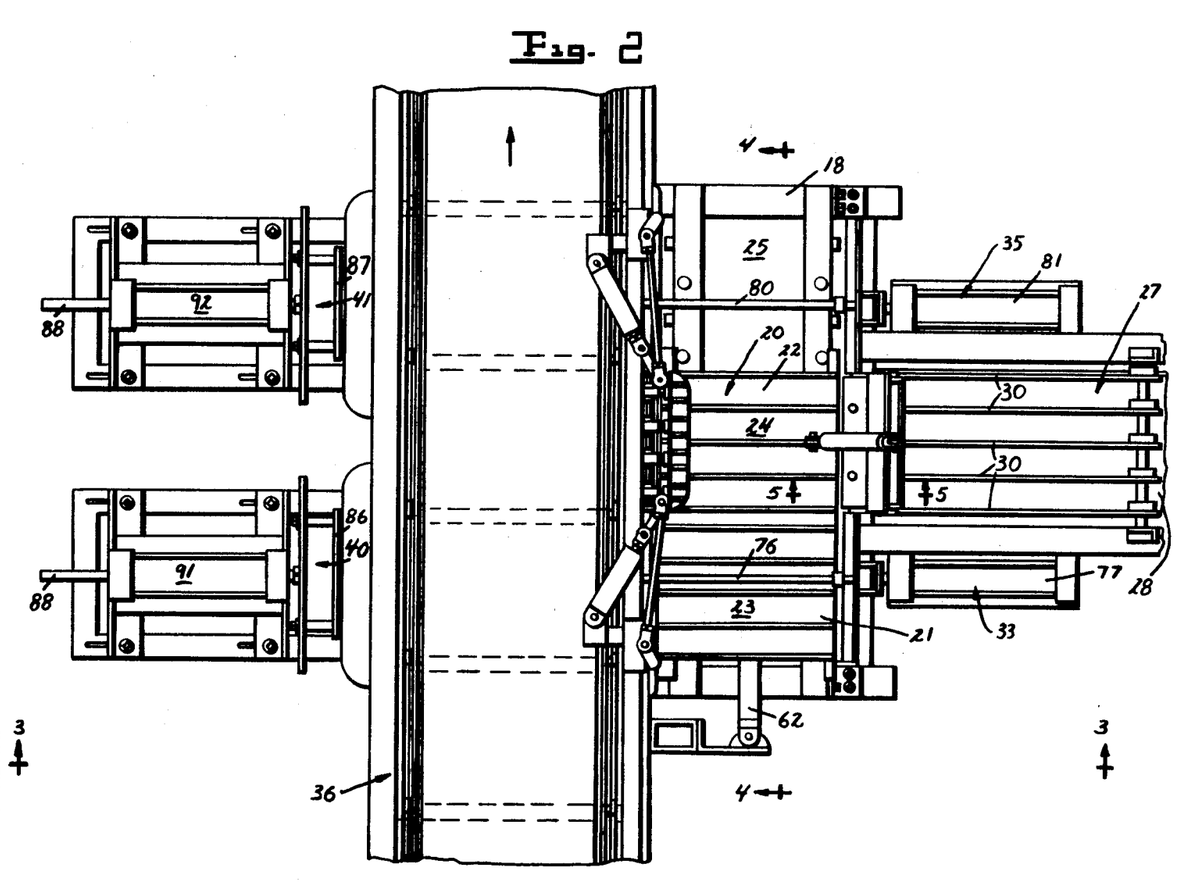
FIG. 2 is a plan view of the end-loading apparatus.

The end-loading machine 15 has a base frame 18 with a reciprocal carriage, broadly identified by the numeral 20, movably mounted thereon (FIGS. 1 and 2). The carriage 20 has a first load compartment 21 and an adjacent second load compartment 22. Each of the load compartments 21 and 22 is capable of receiving a full carton load of articles. As the carriage reciprocates the first load compartment 21 alternates positions between a first loading or discharge station 23 and an intermediate or feeding station 24 while the second load compartment 22 alternates between the intermediate or feeding station 24 and a second loading or discharge station 25 (FIGS. 2 and 7–12).

An article feed conveyor system 27 is mounted perpendicular to the carriage 20 for feeding articles onto the load compartments 21 and 22 at the intermediate station 24. The feed conveyor system 27 has an endless continuous moving conveyor 28 for feeding the articles forward to the carriage 20. A plurality of dividers 30 are transversely spaced above the moving conveyor 28 for separating the articles into rows or lanes. In this embodiment five dividers are transversely spaced above the conveyor for forming four rows or lanes of cans. If twelve articles are to be loaded into each container then four dividers will be used to form three rows or lanes.

An article holding and separating device 31 (FIGS. 1 and 2) is mounted on the frame 18 between the article feed conveyor 27 and the carriage 20 for gripping the forward rank of articles when the carriage is loaded to prevent the further feeding of the articles as the carriage is being shifted. The device 31 also moves the forward rank of articles slightly back to separate the article being fed from those on the carriage to prevent interference and damage to the articles as the carriage is moving.

A stop plate 32 (FIGS. 1 and 4) is mounted on the frame 18 at the intermediate station 24 spaced opposite from the feed conveyor 28 for preventing the articles from being pushed by the feed conveyor off the carriage 20. The stop plate 32 is positioned parallel with the movement of the carriage 20.

A first pusher means 33 is mounted adjacent the first loading station 23 for pushing a load of articles from the first load compartment 21 into a carton when the load compartment 21 is positioned at the first discharge station 23. A second pusher means 35 is mounted adjacent the second loading station 25 for pushing a load of articles from the second load compartment 22 into a carton.

A carton conveyor system 36 is mounted on the frame 18 for sequentially indexing the cartons past the first loading station 23, the intermediate station 24 and the second loading station 25 for receiving the loads of articles at the loading stations 23 and 25. The carton conveyor system 36 moves the cartons forward parallel with the movement of the carriage 20. The carton conveyor 36 moves the cartons forward in a transverse orientation with the open ends of the cartons extending to the sides of the carton conveyor.

Flap gates 37 and 38 (FIG. 4) are mounted between the carriage 20 and the carton conveyor 36 at the first and second loading stations respectively for engaging the flaps on one end of the cartons for maintaining the flaps open while the articles are being pushed into the cartons.

A first backing means 40 (FIGS. 1, 2 and 3) is movably mounted on the opposite side of the carton conveyor from the carriage 20 in alignment with and opposing the first pusher means. The backing means 40 is inserted into the opposite end of the carton adjacent the first loading station 23 to centrally locate the articles in the carton as they are pushed by the first pusher means 33. A second backing means 41 is movably mounted on the same side as the first backing means 40 in alignment with and opposing the second pusher means 34. The backing means 41 enters the carton adjacent the second loading station for centrally locating the articles in the carton.

The article feed conveyor system 27 has a feed conveyor frame 44 for supporting the endless continuous moving conveyor 28. Side brackets 48 are mounted alongside the conveyor 28 for supporting rods 46 that extend transversely over the conveyor 28. The dividers 30 are supported on the rods 46 in a depending manner above the upper flight surface of the conveyor 28. The transverse position of each of the dividers 30 may be adjusted by moving the dividers along the rods 46.

Figure 5:
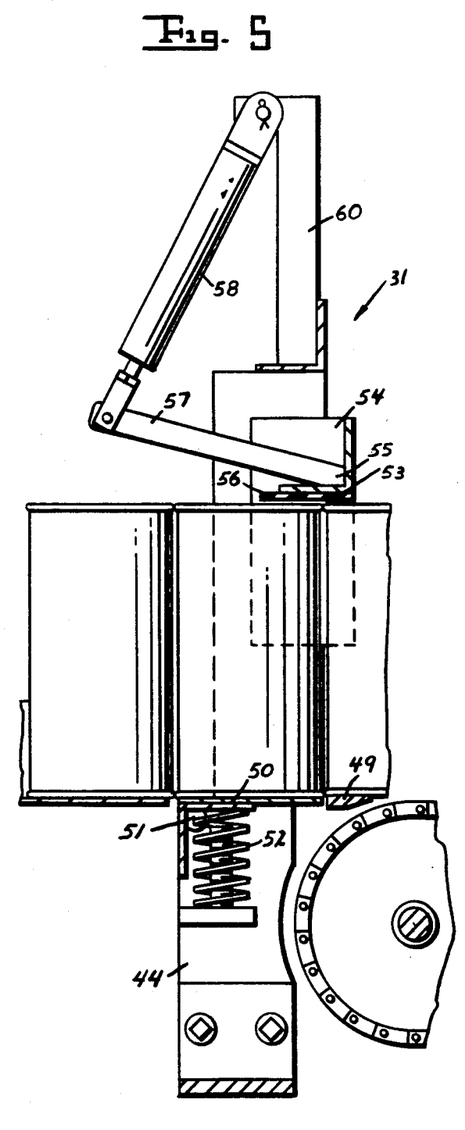
FIG. 5 is a fragmentary enlarged detail cross sectional view taken along line 5—5 in FIG. 2 emphasizing an article holding and separating device shown in the inoperative condition.
Figure 6:
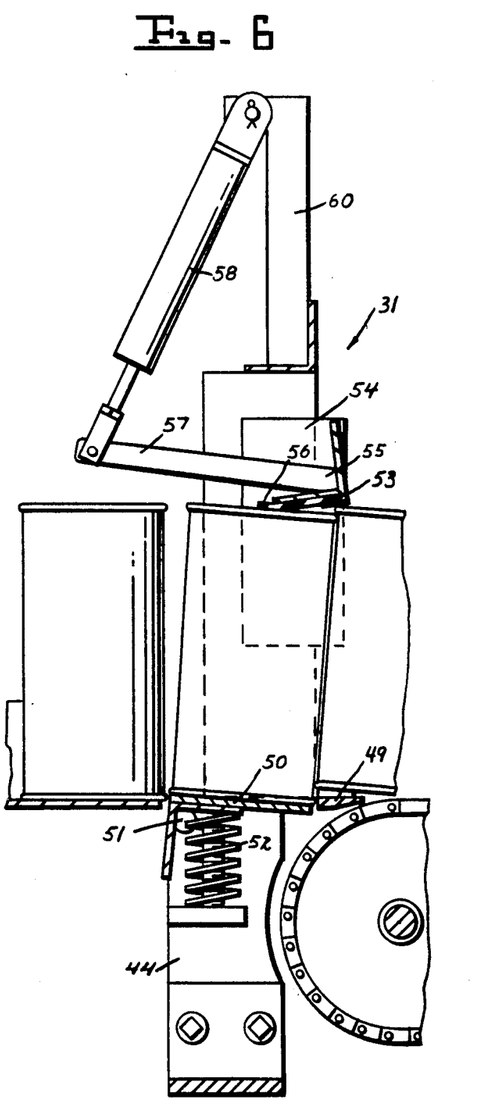
FIG. 6 is a fragmentary cross sectional view similar to FIG. 5 showing the holding and separating device in the operative condition.

The article holding and separating device 31 is shown in detail in the cross sectional views of FIGS. 5 and 6. The device 31 is positioned between the carriage 20 and the feeding conveyor 28 for permitting the cans to slide therethrough onto the carriage when the carriage 20 is stopped and for preventing the advancement of the articles onto the carriage 20 when the carriage 20 is moving. The device 31 also separates the articles that are on the carriage 20 from the succeeding articles by moving the rank of articles immediately behind the articles on the carriage back a small distance so that the rank of cans does not interfere or scrape the articles on the carriage 20 as the carriage is shifted.

A transverse fixed plate 49 (FIGS. 5 and 6) is mounted on the frame immediately forward of upper flight of the feed conveyor 28 for supporting the cans as they move forward from the upper flight surface of the conveyor 28. A lower pivot plate 50 is transversely mounted on the conveyor frame 44 immediately forward of the fixed plate 49 for supporting the cans between the fixed plate 48 and the carriage 20. The plate 50 is pivotally mounted for movement about an axis 51 that is located immediately adjacent the carriage 20 so that the upper surface of the plate 50 may pivot clockwise as viewed in FIGS. 5 and 6 to permit the tilting of the rank of articles supported thereon backwards away from the carriage 20. A spring 52 is mounted beneath the pivot plate 50 for biasing the plate upwardly to a normally horizontal position to provide a smooth surface between the fixed plate 49 and the carriage 20.

The article holding and separating device 31 also includes an upper pivot plate 53 that is pivotally mounted transverse to the movement of the articles on the feed conveyor 28. The upper plate 53 is mounted between side brackets 54 that extend upwardly from the frame 44. The upper pivot plate 53 pivots about an axis 55 that is offset rearward from the lower pivot plate 51 so that the counterclockwise movement of the plate 53 against the upper surface of the articles causes the rank of articles supported on the lower pivot plate 50 to tilt rearward as shown in FIG. 6. A resilient pad 56 is mounted along the lower surface of the pivot plate 53 to prevent damage to the upper surface of the cans as they are being pivoted. A lever 57 is attached to the upper pivot plate 53 and extends outwardly radially from the axis 55. An actuator 58 is supported on a frame bracket 60. The rod of the actuator 58 is attached to the end of the lever 57 for pivoting the upper pivot plate downwardly into engagement with the upper surface of a rank of articles supported on the lower pivot plate 50.

When cans are tilted on the lower pivot plate 50, the chimes of the cans move slightly upwardly and rearwardly from the chimes of the last rank of the cans on the carriage to prevent the chimes of the cans on the lower pivot plate from rubbing against or scraping the side surfaces of the cans on the carriage.

Figure 3:
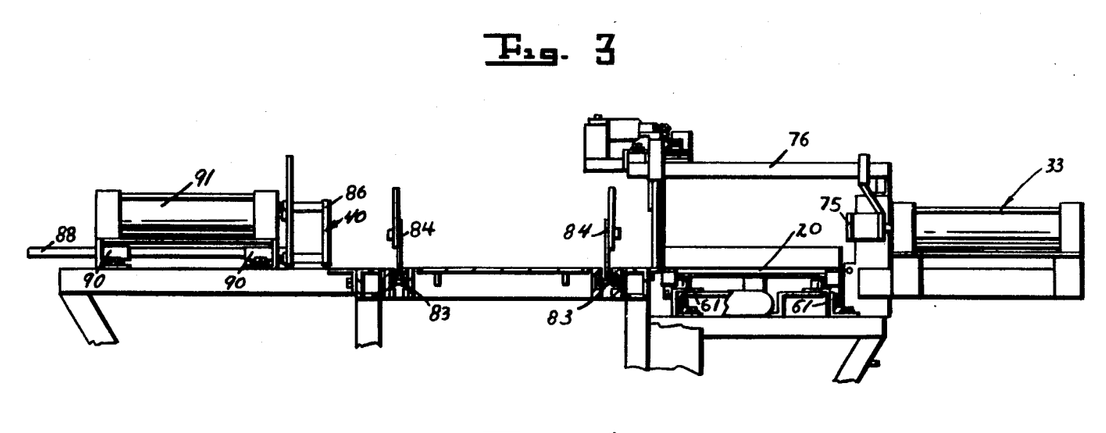
FIG. 3 is a cross-sectional view taken along line 3—3 in FIG. 2.
Figure 4:
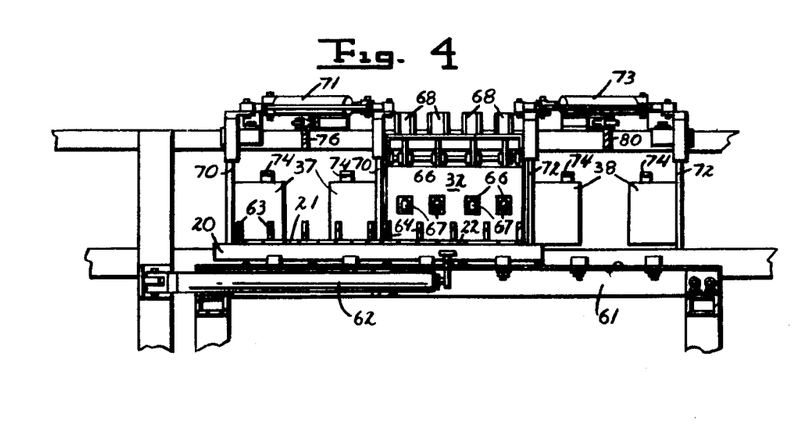
FIG. 4 is a cross sectional view taken along line 4—4 in FIG. 2.

The carriage 20 is movably mounted on spaced side rails 61 (FIGS. 3 and 4). An actuator 62 is mounted below the carriage 20 for moving the carriage back and forth. The first load compartment 21 has five dividers 63 formed thereon to maintain the articles in the established rows and for preventing the articles from sliding off the carriage as the carriage is shifted. The second load compartment 22 also has five upright dividers 64.

The stop plate 32 has four apertures 66 (FIG. 4) formed therein in alignment with the four rows of the feed conveyor 27. Feeler arms 67 extend through the apertures 66 for sensing the presence of a full load of articles on the load compartment 21 or 22 that is positioned at the receiving station. The feeler arms 67 are connected to respective switches 68 that are wired in series for activating the carirage when a full load of articles is fed onto one of the load compartments 21 or 22.

The flap gates 37 are mounted on vertical pivot rods 70 (FIG. 4) for pivotal movement into one end of the cartons to spread the end flaps open to permit the insertion of a full load of articles into the carton at the first loading station 23. An actuator 71 is operatively connected to both pivot rods 70 for pivoting the flap gates 37 into and out of the ends of the cartons. The flap gates 38 are mounted on vertical pivot rods 72 that rotate for pivoting the gates 38 into and out of the ends of the containers positioned alongside the second loading station 25. The movement of the flap gates 38 is controlled by an actuator 73 that is operatively connected to the pivot rods 72. Each of the flap gates 37 and 38 has upper cam plates 74 formed thereon for biasing the upper flap of the cartons open as the gates are pivoted into the ends of the cartons.

The first pusher means 33, mounted adjacent the first loading station 23, includes a pusher plate 75 (FIG. 1) that is mounted parallel with the movement of the carriage. The pusher plate 75 is slidably supported below a bar 76 (FIG. 3) that extends over the first loading station 23 for supporting the pusher plate 75 as it is moved back and forth over the carriage. The pusher plate 75 is moved by an actuator 77 that is mounted parallel alongside the feed conveyor 27. The second pusher means 34, mounted adjacent the loading station 25, includes a pusher plate 78 that is aligned with the movement of the carriage 20. The pusher plate 78 is slidably supported below a bar 80 that extends over the second loading station 25. The pusher plate 78 is moved back and forth by an actuator 81 mounted parallel alongside the other side of the feed conveyor 27.

The carton conveyor system 36, as may be particularly seen in FIG. 3, includes two spaced parallel chains 83 that have longitudinally spaced carton lugs 84 mounted thereon for holding the cartons erected transversely across the conveyor 36. The conveyor system 36 intermittently indexes the cartons forward one position each time the carriage 20 moves in either direction.

The backing means 40 and 41 includes backing plates 86 and 87 respectively that are on the opposite side of the carton conveyor 36 from the carriage 20 in alignment and opposing pusher plates 75 and 78 respectively. Each of the backing plates 86 and 87 are supported on rods 88 (FIGS. 2 and 3) that are slidably mounted in bearings 90. The backing plates 86 and 87 are moved by actuators 91 and 92 respectively that are mounted transverse to the movement of the carton conveyor 36 for positioning the backing plates in the opposite ends of the cartons to centrally locate the articles in the cartons. The backing means 40 and 41 may be deleted if the adjacent ends of the cartons are closed prior to the loading sequence.

Figure 7:
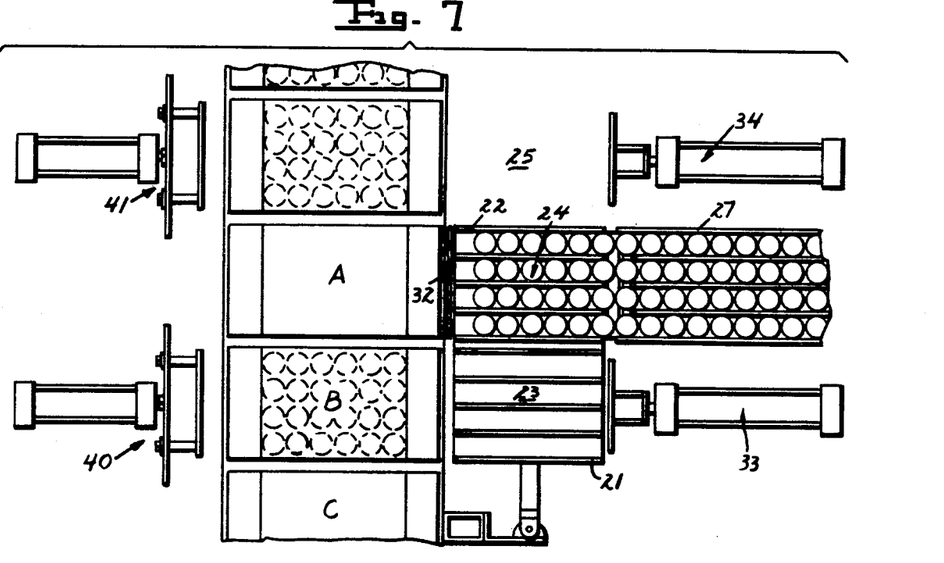
FIG. 7 is a sequence schematic plan view of the end-loading apparatus showing a load of articles loaded into a carton from a reciprocable carriage at a first loading station and a load of articles being fed onto the reciprocal carriage at an intermediate station.
Figure 8:
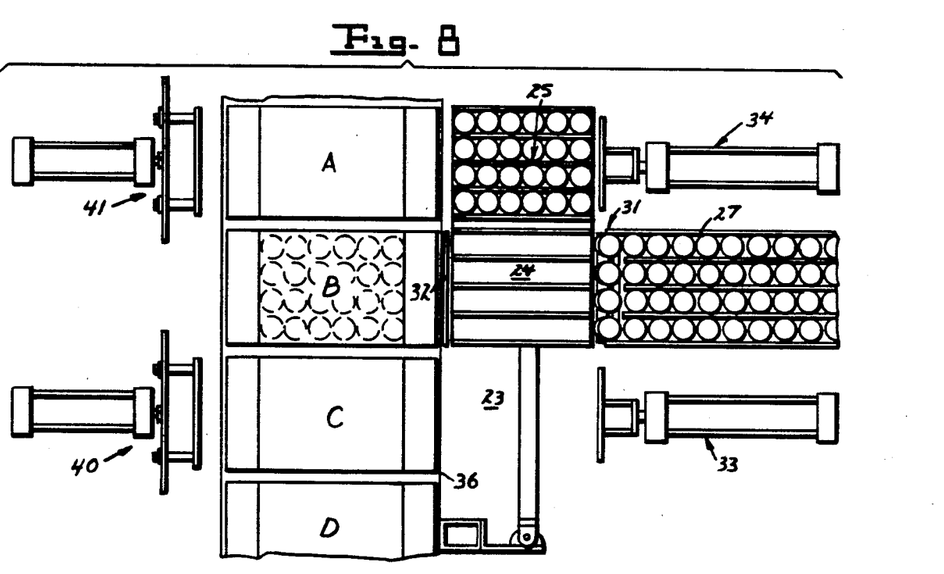
FIG. 8 is a sequence schematic plan view similar to FIG. 7 showing the reciprocal carriage being moved to position the charge of articles at a second loading station.

The sequence of operation of the end loading apparatus is illustrated in sequential steps illustrated in FIGS. 7–12. Although the FIGS. 7–12 illustrate the loading of twenty-four cans in each carton, it should be appreciated that various combinations of carton sizes and number of articles per carton may be used without deviating from the principles of this invention. For purposes of illustration, certain of the cartons are lettered A, B, C and D. Since the machine operates on a continuous basis the starting point for describing the operation is arbitrary. The starting point for purposes of illustration will be taken at the step in which the carriage 20 is shifted to position a full load of cans at the first loading station 23. The fully loaded first load compartment 21 is located at a first loading station 23 and the empty second loading compartment 22 is located at the intermediate station 24. When the carriage was shifted to this position, the carton conveyor 36 moved the cartons forward to position an empty carton A alongside the intermediate station and a succeeding empty carton B alongside the first loading station (FIG. 7). The first pusher means 33 and the backing means 40 are then actuated to load twenty-four cans from the load compartment 21 centrally into carton B. While the loading of carton B is proceeding, a new load of cans are being fed from the feed conveyor 27 onto the second load compartment 22 positioned in alignment with the feed conveyor at the intermediate station 23. When the second load compartment 22 is fully loaded, as is sensed by the feeler arms 67, the carriage actuator 62 is operated to shift the carriage 20 to position the second load compartment 22 at the second discharge station between the second pusher means and the empty carton A (FIG. 8). As the carriage 20 moves the carton conveyor 36 indexes the cartons forward to position the empty carton A alongside the second loading station 25, and the full carton B alongside the intermediate station 24 behind the stop plate 32 and an empty carton C alongside the first loading station.

Figure 9:
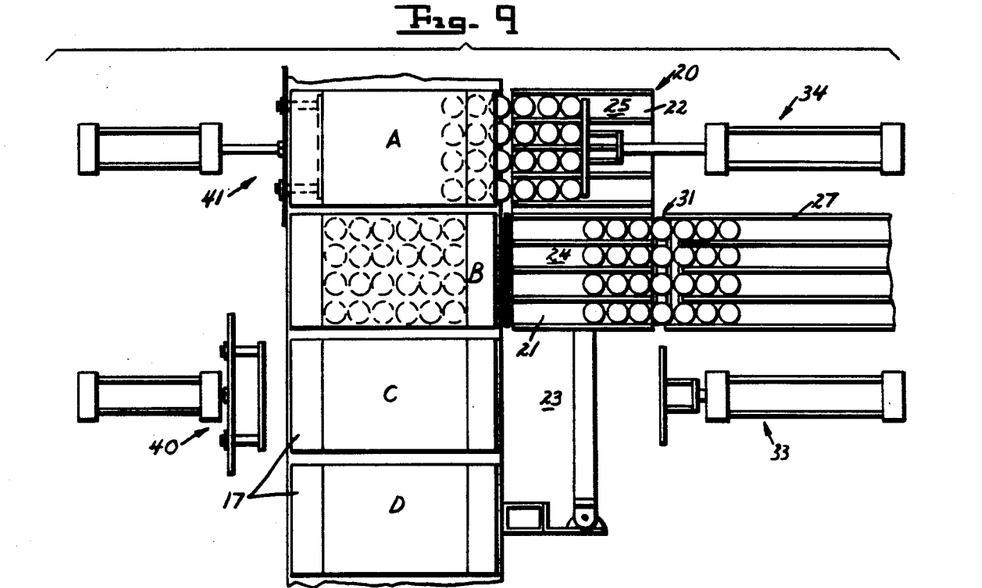
FIG. 9 is a sequence schematic plan view similar to FIG. 8 showing a pusher means loading the charge of articles into a carton positioned adjacent the second loading station and the feeding of a new charge of load of articles onto the carriage at the intermediate station.
Figure 10:
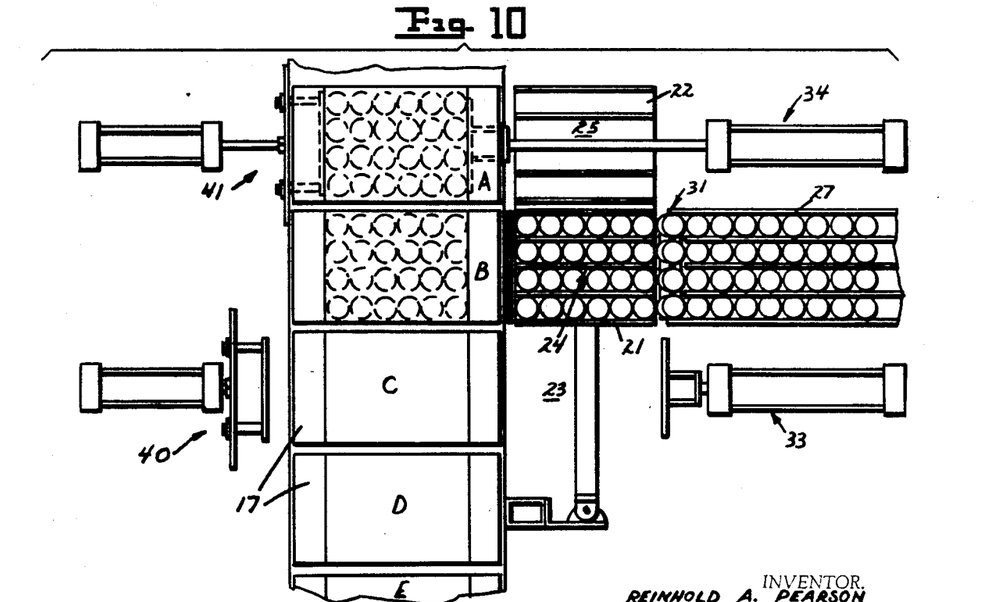
FIG. 10 is a sequence schematic plan view similar to FIG. 9 showing the charge of articles loaded into the container adjacent the second loading station and a second charge of articles being fed onto the carriage at the intermediate station.

When the carton A and the second load compartment 22 are aligned at the second loading station 25, the pusher means 34 and the backing means 41 are operated to move the load of cartons or cans from the second load compartment 22 centrally into the empty carton A (FIG. 9). While carton A is being loaded, the first load compartment 21 is being fed a load of cans from the feed conveyor 27. As shown in FIG. 10 when a complete load of cans is fed into the first carriage compartment 21 the holding and separating device 31 is actuated to tilt the rank of cans immediately behind the cans on the conveyor backwards away from the carriage to prevent the forward rank from interfering or damaging the cans on the carriage as they are moved to the first loading station.

Figure 11:
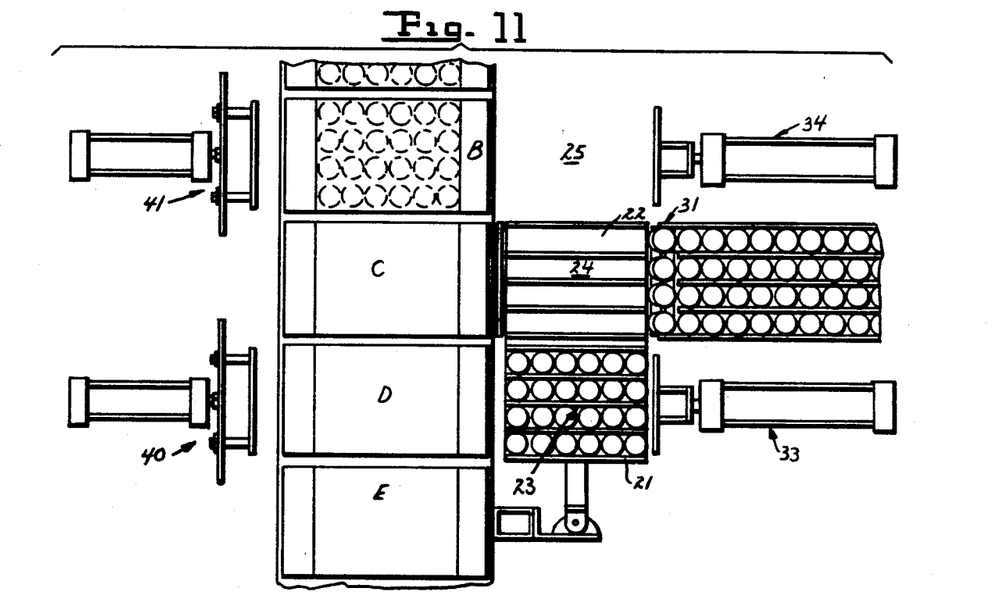
FIG. 11 is a sequence schematic plan view similar to FIG. 10 showing the carriage being moved to position a load of articles at the first loading station.
Figure 12:
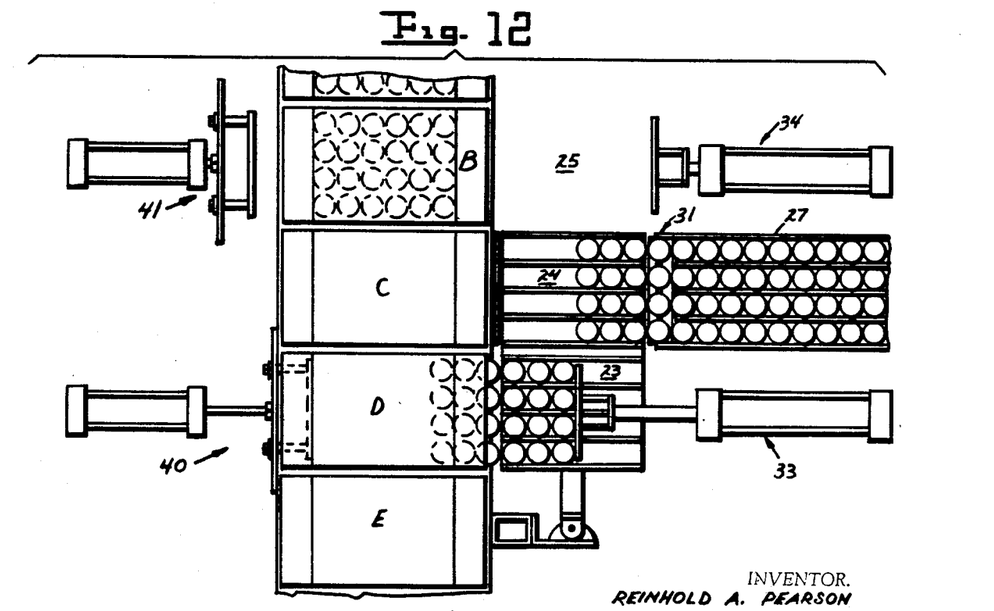
FIG. 12 is a sequence plan schematic view similar to FIG. 11 showing the load being pushed from the carriage by a pusher means into a carton positioned adjacent the first loading station and the feeding of a load of articles onto the carriage at the intermediate station.

After carton A is loaded and a full load of cans are on the first load compartment 21, the carriage is shifted to move the full first load compartment 21 to the first loading station 23 and the empty second load compartment to the intermediate station 24 (FIG. 11).

As the carriage is shifted to move the loaded first compartment 21 to the first loading station, the carton conveyor indexes the cartons forward to position the loaded carton B adjacent the second loading station 25, the empty carton C adjacent alongside the intermediate station 24, and an empty carton D alongside the first loading station 23. When the carton D and the load compartment 21 are aligned at the first loading station, the first pusher means 33 and the backing means 40 are operated to load the charge of cans from the first loading compartment into carton D. As the load of cans is loaded into the carton D, the holding and separating device 31 is de-energized to permit the feeding of cans onto the second load compartment 22 at the intermediate station.

It should be noted that the carton conveyor 36 index the cartons forward a uniform distance each time the carriage 20 moves. The increment that they are moved is greater than the width of the cartons. The stroke of the carriage 20 is equal to the indexing distance to center the load compartments 21 and 22 with respect to the cartons. The center to center distance between the load compartments 21 and 22 is also equal to the indexing distance. The loading stations 23 and 25 are spaced center to center twice the indexing distance so that the carton must be indexed twice to move from the first loading station 23 to the second loading station 24.

It should be emphasized that each time the carriage 20 moves in either direction the carton conveyor 36 indexes the cartons forward so that an empty carton is positioned adjacent the intermediate station 24 when a full load of cans is at the first loading station. In this manner, an empty carton may be indexed to the second loading station during the next stroke of the carriage. In this manner one carton conveyor system can adequately and efficiently service the two loading stations 23 and 25.

It should be noted that the only time the feed conveyor 27 is not feeding articles is during the short span of time in which the carriage is being shifted. This greatly increases the production rate of end-loading machines.

It is understood that the above described embodiment is simply illustrative of the principles of this invention and numerous modifications may be made without deviating from the principles of this invention. Therefore only the following claims are intended to define this invention.

What is claimed is:

1. An apparatus for end-loading cartons with uniform sized articles such as bottles or cans, said apparatus comprising:
   (a) an intermittently driven carton conveyor for supporting transversely oriented open-ended cartons and for successively indexing the cartons to a first station, an intermediate station, and a second loading station along the length of the conveyor;
   (b) a reciprocable carriage mounted for back and forth movement along one side of the conveyor in a direction parallel to the movement of cartons on the carton conveyor, said carriage having two adjacent load compartments that alternate positions between the loading stations and the intermediate station as the carriage is shifted back and forth;
   (c) a first pushing means adjacent the first loading station for pushing a full load of articles from one of the load compartments into a carton positioned alongside the first loading station;
   (d) A second pushing means adjacent the second loading station for pushing a full load of containers from the other load compartment into a carton positioned alongside the first loading station;
   (e) feeding means located adjacent the intermediate station for feeding a load of articles onto the carriage load compartments when they are positioned at the intermediate station; and
   (f) wherein the carton conveyor successively indexes the cartons from one station to the next each time the carriage moves so that an empty carton moves to the intermediate station as the carriage shifts to position a load compartment at the first loading station.

2. An end-loading apparatus as defined in claim 1 wherein the first loading station, the intermediate station and a second loading station are evenly spaced alongside the carton conveyor and wherein the conveyor sequentially centers the cartons at the respective stations.

3. An end-loading apparatus as defined in claim 1 wherein the cartons are open at both ends with the end flaps extending outwardly and wherein the pusher means push the articles through one end of the cartons and wherein the apparatus further comprises movable backing plates located on the other side of the conveyor opposing the pusher means for entering the opposite ends of the cartons to centrally position the articles in the cartons.

4. An end-loading apparatus as defined in claim 1 further comprising holding and separating means responsive to the feeding of a full carton load of articles onto the carriage load compartments positioned at the intermediate station for preventing the feeding of additional articles onto the carriage until an empty load compartment is subsequently moved to the intermediate station.

5. An end-loading apparatus as defined in claim 4 wherein the feeding means includes a continuously moving article conveyor for advancing the articles and a plurality of parallel dividers for aligning the articles in rows as the containers are advanced and wherein the holding and separating means is located between the article conveyor and the carriage for engaging the rank of articles immediately succeeding the articles fed onto the carriage and for moving said rank of articles back slightly to separate the articles on the carriage from the succeeding articles before the carriage is shifted.

6. An end-loading apparatus as defined in claim 5 wherein the article holding and separating means comprises:
   (a) a normally horizontal lower support plate mounted between the carriage and the article conveyor for supporting a rank of articles as they are fed from the conveyor to the carriage, said plate being resiliently biased to permit downward movement thereof;
   (b) a movable upper bar mounted above the support plate for engaging the rank of articles immediately behind the articles fed onto the carriage to tilt the said rank back and down against the resiliently biased support plate;
   (c) an actuating means operably connected to the upper bar and responsive to the feeding of a full carton load of articles onto a load compartment positioned at the intermediate station for moving the bar into engagement with said rank of articles to prevent the advancement of the articles on the article conveyor while the carriage is moving and for separating said rank of articles from the articles on the carriage to prevent damage to the articles as the carriage moves.

7. An apparatus for end-loading cartons with articles such as bottles and cans, said apparatus comprising:
(a) a reciprocal carriage having two adjacent carton load compartments in which one load compartment moves between a receiving station and a first discharge station and the other load compartment moves between a second discharge station and the same receiving station as the carriage is reciprocated;
(b) a continuously moving article feed conveyor for feeding the articles to the receiving station;
(c) an article holding means mounted across and adjacent the forward end of the article feed conveyor that is responsive to the feeding of a full carton load of containers onto the load compartment positioned at the receiving station for preventing the feeding of the articles while the carriage is moving;
(d) a drive means operably connected to the carriage that is responsive to the feeding of a full carton load of containers onto the carriage for moving the carriage back and forth to alternate the successive loads between the first and second discharge stations;
(e) an intermittently driven carton conveyor aligned along the side of the carriage for supporting transversely oriented open-ended cartons and for indexing the cartons in a direction parallel to the movement of the carriage each time the carriage moves to sequentially position the cartons alongside the first discharge station, the receiving station, and the second discharge station; and
(f) pusher means mounted adjacent the discharge stations for alternately pushing the successive loads of articles from the carriage into the cartons positioned adjacent the discharge stations.

8. An apparatus for end-loading cartons with uniform sized articles such as cans and bottles, said apparatus comprising:
(a) a reciprocable carriage having two adjacent load compartments longitudinally spaced center to center a preset distance that is greater than the width of the cartons;
(b) reversible drive means operably connected to the carriage for reciprocating the carriage in which the stroke of the carriage is equal to said preset distance for alternating one of the load compartments between a first loading station and a receiving station and the other load compartment between the same receiving station and a second loading station;
(c) intermittently operable article feed conveyor means for feeding articles into the load compartment located at the receiving station;
(d) an intermittently driven carton conveyor positioned alongside the carriage for supporting transversely oriented open-ended cartons and for moving the cartons an incremental distance equal to said preset distance each time the carriage moves in either direction to center empty cartons at the loading stations; and
(e) pusher means mounted adjacent the loading stations for alternately pushing the successive loads of articles from the load compartments into the cartons centered at the loading stations.

References Cited

UNITED STATES PATENTS

| | | | |
|---|---|---|---|
| 2,124,962 | 7/1938 | Ferguson et al. | 53—284 X |
| 2,689,636 | 9/1954 | Currivan | 53—252 X |
| 3,046,712 | 7/1962 | Carter | 53—61 |
| 3,060,659 | 10/1962 | Blais et al. | 53—61 X |

THERON E. CONDON, Primary Examiner

R. L. SPRUILL, Assistant Examiner

U.S. Cl. X.R.

53—159, 168, 252